United States Patent
Zhou et al.

(10) Patent No.: US 11,289,318 B2
(45) Date of Patent: Mar. 29, 2022

(54) MASS SPECTROMETRY ANALYSIS METHOD AND MASS SPECTROMETRY SYSTEM

(71) Applicant: Shimadzu Corporation, Kyoto (JP)

(72) Inventors: Xinfeng Zhou, Shanghai (CN); Ran Qiu, Shanghai (CN); Wenjian Sun, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/212,168

(22) Filed: Mar. 25, 2021

(65) Prior Publication Data
US 2021/0313158 A1 Oct. 7, 2021

(30) Foreign Application Priority Data
Apr. 2, 2020 (CN) .......................... 202010256258.3

(51) Int. Cl.
*H01J 49/00* (2006.01)
*H01J 49/42* (2006.01)
(Continued)

(52) U.S. Cl.
CPC ...... *H01J 49/0036* (2013.01); *G01N 30/7233* (2013.01); *H01J 49/004* (2013.01);
(Continued)

(58) Field of Classification Search
CPC .... H01J 49/0036; H01J 49/0031; H01J 49/40; H01J 49/42; H01J 49/0027;
(Continued)

(56) References Cited

U.S. PATENT DOCUMENTS 6,717,130 B2 4/2004 Bateman et al.
8,809,770 B2 8/2014 Bonner et al.
(Continued)

FOREIGN PATENT DOCUMENTS

CN 109003876 A 12/2018

OTHER PUBLICATIONS

Ducret, Axel et al., "High throughput protein characterization by automated reverse-phase chromatography/electrospray tandem mass spectrometry", Protein Science, 1998, 7, pp. 706-719.
(Continued)

*Primary Examiner* — Kiet T Nguyen
(74) *Attorney, Agent, or Firm* — Locke Lord LLP; Tim Tingkang Xia, Esq.

(57) ABSTRACT

The invention provides a mass spectrometry analysis method and a mass spectrometry system. During implementation of the mass spectrometry analysis method, intensity data of the daughter ions, a first parameter of the daughter ions associated with the first physicochemical property, and a second parameter of the daughter ions associated with the second physicochemical property are all recorded to form a spectrogram data set. In a deconvolution step, the spectrogram data set is deconvoluted to categorize the daughter ions from the same parent ion according to two-dimensional features including the first parameter and the second parameter. In the above manner, the mass spectrometry analysis method and the mass spectrometry system provided by the invention can detect ions that partially overlap spectral peaks of other ions significantly, thereby improving the qualitative and quantitative ability of data analysis for data independent acquisition.

15 Claims, 5 Drawing Sheets

(51) Int. Cl.
*H01J 49/40* (2006.01)
*G01N 30/72* (2006.01)
*G01N 30/02* (2006.01)

(52) U.S. Cl.
CPC ...... *H01J 49/0031* (2013.01); *H01J 49/0045* (2013.01); *H01J 49/40* (2013.01); *H01J 49/42* (2013.01); *G01N 2030/027* (2013.01)

(58) Field of Classification Search
CPC ............ H01J 49/0045; G01N 30/7233; G01N 30/8682; G01N 2030/027; G01N 27/623
USPC .................................................. 250/281, 282
See application file for complete search history.

(56) References Cited

U.S. PATENT DOCUMENTS

| | | | | |
|---|---|---|---|---|
| 9,837,255 | B2* | 12/2017 | Stephenson, Jr | H01J 49/0031 |
| 10,151,758 | B2* | 12/2018 | Yip | G01N 33/6848 |
| 2002/0172961 | A1* | 11/2002 | Schneider | C12Q 1/6872 |
| | | | | 435/6.12 |
| 2003/0139885 | A1* | 7/2003 | Brock | G01N 33/6818 |
| | | | | 702/19 |
| 2019/0064126 | A1* | 2/2019 | Hsiao | B01D 15/34 |
| 2021/0313161 | A1* | 10/2021 | Sun | G01N 27/623 |

OTHER PUBLICATIONS

Tsou, Chih-Chiang et al., "DIA-Umpire: comprehensive computational framework for data-independent acquisition proteomic", Nature Methods, 2015.

Weisbrod, Chad R. et al., "Accurate Peptide Fragment Mass Analysis: Multiplexed Peptide Identification and Quantification", Journal of Proteome Research, 2012, 11, pp. 1621-1632.

Ting, Ying S. et al., "PECAN: library-free peptide detection for data-independent acquisition tandem mass spectrometry data", Nature Methods, 2017.

* cited by examiner

MASS SPECTROMETRY ANALYSIS METHOD AND MASS SPECTROMETRY SYSTEM

CROSS-REFERENCE TO RELATED PATENT APPLICATION

This application claims priority to and the benefit of Chinese Patent Application Serial No. 202010256258.3, filed Apr. 2, 2020, which is incorporated herein in its entirety by reference.

TECHNICAL FIELD

The invention relates to the mass spectrometry field, in particular to a mass spectrometry analysis method and a mass spectrometry system.

BACKGROUND

Currently, high resolution tandem mass spectrometry has become an important analytical instrument for omics analysis (including metabonomics, proteomics, and the like). For complex samples in the omics analysis, a mass spectral data acquisition method with high throughput, high sensitivity and high coverage is needed. A conventional method is data dependent acquisition (DDA) proposed by Ducret et al. in 1998, in which parent ions (or "precursor" ions) are scanned, and then parent ions with a relative high abundance are selected and sequentially enter a collision chamber for dissociation and obtain a daughter ion (or "product" ion) spectrogram. The method can achieve higher analyte coverage, and thus is still a widely adopted acquisition method.

However, since the DDA method can only monitor daughter ion information in one mass-to-charge ratio channel of the parent ions during each daughter ion scanning, utilization efficiency and throughput of the parent ions are low when tandem mass spectrometry analysis is performed, and many parent ions with a lower abundance are still not monitored when a large amount of analytes elute from a chromatographic column at the same time. Meanwhile, since the mass-to-charge ratio channel of the parent ions corresponding to daughter ion scanning events in each cycle is constantly changing, it cannot be guaranteed that the daughter ions of the analytes are detected more uniformly for several times in a chromatographic elution time, and thus a quantitative analysis can be performed only by using an ion current chromatogram of the parent ions of the analytes instead of an ion current chromatogram of the daughter ions, thereby affecting selectivity and accuracy of the quantitative analysis in the omics analysis. Since the parent ions with a higher abundance are preferably selected each time the parent ions are selected for the tandem mass spectrometry analysis, and relative abundances of the ions in the same batch of samples can vary among different injection analyses, and thus this kind of difference will lead to randomness of parent-ion monitoring, and the randomness may cause deviations or errors in biostatistics analysis.

In recent years, data independent acquisition (DIA) has developed rapidly due to a higher sensitivity, a higher dynamic range, a higher analysis throughput, and a better quantitative feature compared to the DDA approach. The DIA method is represented by an MSE method described in the U.S. Pat. No. 6,717,130 of Micromass and an SWATH (sequential-window acquisition of all theoretical mass spectra) method described in the U.S. Pat. No. 8,809,770 of AB Sciex.

The SWATH method is mainly directed to targeted analysis, so that instead of performing a parent-ion pre-scanning, the parent ions usually are directly segmented according to a mass number window, for example, each segment is 25 Da, then each segment of parent ion selected by a quadrupole is introduced into a collision chamber together for dissociation, a daughter-ion spectrogram is recorded and compared to a database, and a daughter-ion intensity is used for quantification. Therefore, and it is often used for targeted quantitative analysis, and is not suitable for qualitative analysis. The SWATH method has non-negligible deficiencies as follows. On the one hand, the SWATH method relies too much on the establishment of a high-quality daughter-ion spectrogram database and the matching of experimental conditions; on the other hand, it is difficult to implement untargeted metabolomics analysis. In recent years, alternatives to the SWATH method that do not rely on the spectrogram database have also gained long-term development, such as DIA-Umpire (Tsou et al., 2015), FT-ARM (Weisbrod et al., 2012), and PECAN (Ting, et al., 2017).

In the MSE method, a parent-ion scanning is performed first, then a wider mass segment or even all the parent ions are put into the collision chamber for dissociation, a daughter-ion spectrogram is recorded, and a deconvolution algorithm is used to correlate a parent ion and a daughter ion to further obtain a daughter-ion mass spectrogram of a single substance according to that the parent ion and the daughter ion of the same analyte have the same features in aspects of a retention time or a peak shape in a chromatogram. The subsequent qualitative and quantitative analyses depend on the daughter-ion mass spectrogram obtained by deconvolution.

In order to further improve the sensitivity and increase dimensions of orthogonal separation, more and more manufacturers are coupling ion mobility-based separation devices to a chromatographic-tandem mass spectrometry device. Since the ion mobility-based separation devices, such as an ion mobility spectrometry instrument (e.g., a time scale of an analysis cycle is 10 ms), and the chromatogram (e.g., a time scale of an analysis cycle is 1200 s), mass spectrum (e.g., TOF-MS is 100 μs) work at different magnitudes of frequencies, these devices can effectively cooperate and connect with each other for cascading separation and analysis.

In some technical solutions in the prior art, with respect to data analysis of a chromatogram-ion mobility spectrum-mass spectrum system, it is necessary to deconvolute a mass spectrometry data set by using chromatographic data and ion mobility spectrum data to categorize the daughter ions from the same parent ion.

Specifically, a data set obtained by the chromatogram-ion mobility spectrum-mass spectrum system contains at least data of four dimensions including mass-to-charge ratio, retention time, ion mobility, intensity for each of the daughter ions. To determine which of the daughter ions origin from the same parent ion, a determination method is generally that these daughter ions should have basically the same retention time and ion mobility.

The chromatogram-ion mobility spectrum-mass spectrum system has one advantage that it is possible to provide a separation means of ion mobility spectrum and further separate peaks that are partially or completely overlapped in the chromatogram by using different ion mobility properties, thereby improving the identification capability of the parent ions.

In the prior art, the method for deconvolution using the chromatographic data and the ion mobility spectrum data is generally adopted in the following manner. Firstly, an intensity-retention time spectrum of the daughter ions is established and a chromatographic spectrum is deconvoluted without considering the ion mobility spectrum data; then, as to spectral peak data at the edge of a set confidence interval using the retention time for deconvolution, an intensity-ion mobility spectrum of the daughter ions is established, and the ion mobility spectrum is deconvoluted; finally, the daughter ions with basically the same or similar peak shape and retention time (or the daughter ions with basically the same or similar peak shape and ion mobility) in each mass-to-charge ratio value or mass-to-charge ratio window are clustered into one category and determined to come from the same parent ion. Of course, a sequential order of deconvolution for the chromatographic data and deconvolution for the ion mobility spectrum data may also be interchanged, and the details will not be repeated herein.

In the process of implementing the present invention, the inventor found that the prior art has at least the following problems. In the prior art, in the process of deconvoluting a mass spectrometry data set by using two data of different dimensions, two deconvolution tasks of different dimensions are performed sequentially, that is, the data of the first dimension is used to deconvolute the mass spectrometry data set until completion; then the data of the other dimension is used to deconvolute the data at a critical position of a confidence interval in the first dimension deconvolution operation; finally, results of the two deconvolutions are merged to determine which category these daughter ion peaks should be clustered to and which parent-daughter ion pairs these daughter-ion peaks should be assigned to respectively.

The above sequentially performed deconvolution methods result in that if a chromatographic peak of some daughter ion A basically overlaps with a daughter ion B while an ion mobility spectrum peak thereof (daughter ion A) in turn basically overlaps with a daughter ion C, then the daughter ion A basically cannot be detected in the process described above.

Specifically, assume that the following three types of daughter ions are obtained by dissociation in a certain analysis process of the chromatogram-ion mobility spectrum-mass spectrometry system, which are IonA, IonB, and IonC respectively:

|  | Retention Time | Chromatographic peak shape | Ion mobility | Mobility spectrum peak shape |
|---|---|---|---|---|
| IonA | R1 | TypeA1 | M1 | TypeA2 |
| IonB | R1 | TypeA1 | M2 | TypeB |
| IonC | R2 | TypeC | M1 | TypeA2 |

According to the analysis of the above situation, IonA, IonB and IonC belong to different types of daughter ions, and should be assigned to different parent ions under ideal conditions. However, when adopting the deconvolution method in the prior art, since IonA and IonB have the same retention time and chromatographic peak shape, a single peak will appear after overlapping the chromatographic peaks of the two ions, and the three ions will present a double peak on the chromatographic spectrum. Similarly, a single peak will appear after overlapping mobility spectrum peaks of IonA and IonC, and the three ions will also present a double peak on the ion mobility spectrum. Since both the chromatogram and the ion mobility spectrum show double peaks, no matter any data of the above dimensions is used to deconvolute the mass spectrometry data set firstly, the existing stepwise deconvolution methods can only identify two types of ions therefrom. As a result, certain types of daughter ions, such as IonA, are hidden during the deconvolution process, which affects the ion discrimination ability of the system.

SUMMARY

In view of the above problems, the present invention provides a mass spectrometry analysis method capable of identifying ions that partially overlap spectral peaks of other ions significantly, take a certain daughter ion A as an example, in which a chromatographic peak of the daughter ion A overlaps with a daughter ion B, and an ion mobility spectrum peak of the daughter ion A overlaps with a daughter ion C; and improving the qualitative and quantitative ability of data analysis for data independent acquisition.

The mass spectrometry analysis method includes: a first separation step, separating a sample to obtain multiple groups of intermediates based on differences of a first physicochemical property; a second separation step, separating intermediates or ionized intermediates to obtain multiple groups of parent ions based on differences of a second physicochemical property; a dissociation step, in which at least part of the parent ions are dissociated, and the dissociated parent ions correspondingly generate multiple daughter ions; a detection step, in which at least an intensity of a daughter ion generated in the dissociation step is detected, during the implementation of the mass spectrometry analysis method, intensity data of daughter ions, a first parameter of the daughter ions associated with the first physicochemical property, and a second parameter of the daughter ions associated with the second physicochemical property are all recorded to form a spectrogram data set; and a deconvolution step, in which the spectrum data set is deconvoluted to categorize the daughter ions from the same parent ion according to the two-dimensional features including the first parameter and the second parameter.

Through the above methods, the deconvolution process uses two-dimensional features that include the first parameter and the second parameter at the same time. Therefore, when performing deconvolution for IonA, IonB, and IonC in the background art, it can be determined that IonA, IonB, and IonC should be assigned to different parent ions according to the difference in two-dimensional features, so that ions like IonA that significantly overlaps with ion peaks of other ions (IonB, IonC) and may be hidden in the resolution process of the prior art can also be accurately clarified in the deconvolution process of the present invention, thereby improving the qualitative and quantitative ability of data analysis for data independent acquisition.

In an alternative technical solution of the present invention, intensities of multiple groups of parent ions are also detected in the detection step.

In an alternative technical solution of the present invention, the detection step includes stopping or reducing dissociation energy applied to the parent ions, so as to detect the intensities of multiple groups of parent ions.

In an alternative technical solution of the present invention, the deconvolution step includes a heatmap generation step, in which a coordinate system is established with the first parameter and the second parameter to generate multiple heatmaps based on the spectrogram data set, and each heatmap is associated with daughter ions of one type of mass-to-charge ratio or within a mass-to-charge ratio range; and a cluster analysis step, in which three-dimensional features that occupy the same first parameter range and the same second parameter range and match each other in different heatmaps are clustered according to a cluster analysis model.

In an alternative technical solution of the present invention, the mass spectrometry analysis method further includes a cluster model training step, in which the cluster analysis model is trained according to scores of clustering results in the cluster analysis step.

In an alternative technical solution of the present invention, the mass spectrometry analysis method further includes an MS/MS spectrum generation step, in which an MS/MS spectrum of clustered daughter ions is generated based on a mass-to-charge ratio or a mass-to-charge ratio range corresponding to the heatmap where clustered feature distribution is located; and a search matching step, in which a pre-established database is searched for substance identification of the parent ion according to an MS/MS spectrum generated in the MS/MS spectrum generation step and the corresponding relationship between parent ions and daughter ions.

In an alternative technical solution of the present invention, in the MS/MS spectrum generation step, integral is performed with respect to intensity data of the daughter ions that are clustered in the heatmap so as to determine the intensity of the daughter ions corresponding to the mass-to-charge ratio or the mass-to-charge ratio range in the MS/MS spectrum.

In an alternative technical solution of the present invention, in the detection step, the intensity data of the daughter ions are acquired using a data independent acquisition method.

The invention further provides a mass spectrometry system, including: a first separation unit used for separating a sample to obtain multiple groups of intermediates based on differences of the first physicochemical property; a second separation unit used for separating intermediates or ionized intermediates to obtain multiple groups of parent ions based on differences of the second physicochemical property; a dissociation unit used for dissociating at least part of the parent ions, in which the dissociated parent ions correspond to generation of multiple daughter ions; a detection unit at least used for detecting an intensity of a daughter ion generated in the dissociation unit, and the mass spectrometry system can record the intensity data of the daughter ions, the first parameters of the daughter ions associated with the first physicochemical properties, and the second parameters of the daughter ions associated with the second physicochemical properties so as to form a spectrogram data set; and a processor used for deconvoluting the spectrogram data set according to the two-dimensional features including the first parameter and the second parameter, so as to categorize the daughter ions from the same parent ion.

In an alternative technical solution of the present invention, the first separation unit is a chromatographic instrument and the second separation unit is an ion mobility spectrometer.

In an alternative technical solution of the present invention, the ion mobility spectrometer is one or a combination among a drift tube ion mobility spectrometer, a field asymmetric waveform ion mobility spectrometer, a traveling wave ion mobility spectrometer, an aspiration ion mobility spectrometer, a tandem-trapped ion mobility spectrometer, and a U-shape ion mobility spectrometer.

In an alternative technical solution of the present invention, the ion mobility spectrometer includes: an ion introduction device used for introducing the intermediates into a post-stage device, or temporarily storing the received intermediates while releasing the intermediates to the post-stage device at the same time; and an ion mobility separation device that is provided downstream of the ion introduction device to receive the intermediates and separate the intermediates during a moving process according to differences in ion mobility.

In an alternative technical solution of the present invention, the dissociation unit is a collision chamber, a photodissociation chamber, or an electron capture dissociation chamber.

In an alternative technical solution of the present invention, the dissociation unit and the detection unit are integrated into the same ion trap mass analyzer.

In an alternative technical solution of the present invention, the detection unit includes a first mass analyzer and a second mass analyzer, in which the first mass analyzer is a quadrupole mass analyzer, an ion trap mass analyzer, or a time-of-flight mass analyzer, and the second mass analyzer is a quadrupole mass analyzer, a time-of-flight mass analyzer or a Fourier transform mass analyzer.

Figure 1:
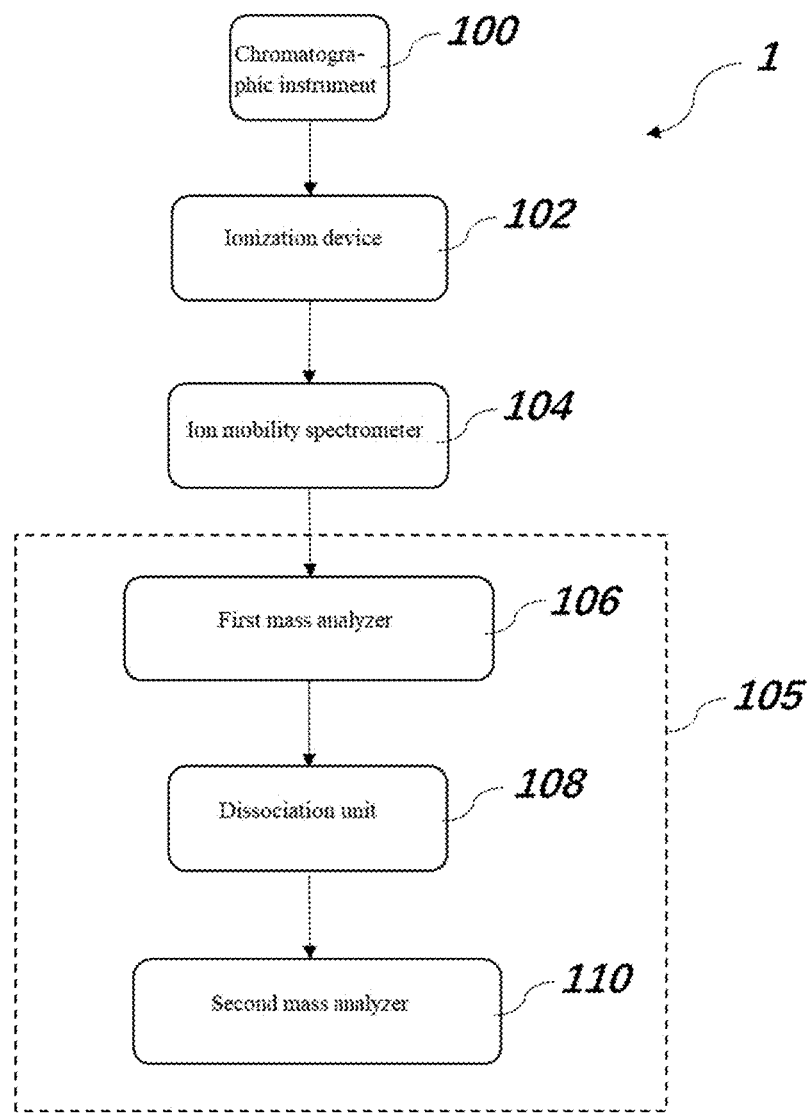
FIG. 1 is a schematic diagram of a mass spectrometry system according to one embodiment of the present invention.

Reference Numerals: 100—chromatographic instrument, 102—ionization device, 104—ion mobility spectrometer, 105—mass spectrometer; 106—first mass analyzer; 108—dissociation unit, 110—second mass analyzer; 112—processor.

DETAILED DESCRIPTIONS

Hereinafter, the technical solution of embodiments in the present invention will be described clearly in detail with reference to the accompanying drawings in the embodiments thereof. Obviously, the described embodiments are only a part of the embodiments in the present invention, and are not all the embodiments thereof. Based on the embodiments in the present invention, all other embodiments obtained by those skilled in the art without creative work shall fall within the scope of the present invention.

It should be noted that, as used herein, the term "deconvolution" means deconvolution in a broad sense rather than a deconvolution operation in a mathematical sense. A deconvolution process herein is a process of clarifying parent-daughter ion pairs, that is, a process of mining additional information hidden in existing data information via existing information.

Here, deconvolution is performed by using "two-dimensional features", in other words, two-dimensional deconvolution means clustering a data set without a label of a parent-daughter ion pair to obtain a clear parent-daughter ion corresponding relationship by using original data in a definition domain including but not limited to a first physical property and a second physical property through a clustering algorithm.

Figure 2:
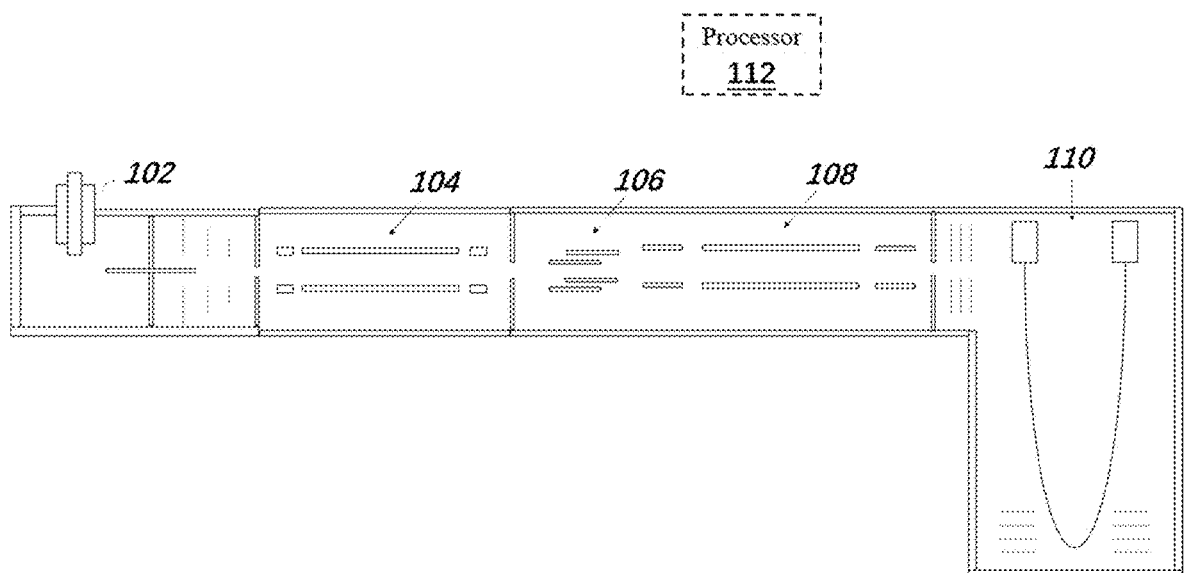
FIG. 2 is a structure chart of a portion of the mass spectrometry system of the embodiment in FIG. 1.

As shown in FIGS. 1 and 2, the embodiment provides a chromatogram-ion mobility spectrum-mass spectrometry system 1 (LC-IMS-MS) that mainly includes three device modules of a chromatographic instrument 100, an ion mobility spectrometer 104, and a mass spectrometer 105.

The chromatographic instrument 100 is a liquid chromatographic instrument, i.e., a first separation unit in the present embodiment, which can separate a sample based on differences in a first physicochemical property of the samples (via a retention time of a chromatographic column), separate a sample of mixture into multiple groups of intermediates, and chromatographically separate received chromatographic data into first characteristic data associated with the retention time (separation time), in which the retention time of a passing analyte is recorded, and a first parameter (retention time parameter, RT) associated with the retention time of each of the daughter ions can be further deduced by using corresponding relationships between the chromatographic data and a subsequent acquired mass spectrometry data timing sequence or between the chromatographic data and a peak position.

Effluents of the chromatographic instrument, i.e., multiple groups of intermediates, are ionized by an ionization device 102 and sent to an ion mobility spectrometer 104.

The ion mobility spectrometer 104, i.e., a second separation unit in the present embodiment, can perform secondary separation on components in the sample that are difficult to be effectively separated according to the retention time by using differences in ion mobility. Data obtained by the ion mobility spectrometer 104 is second characteristic data associated with ion mobility, such as ion mobility spectrum data. The ion mobility spectrum data records the ion mobility data of various passing parent ions, such as ion mobility or collision cross-sectional area, and a second parameter (ion mobility, M) associated with the ion mobility of each of the daughter ions can be further deduced by using corresponding relationships between the ion mobility spectrum data and a subsequent acquired mass spectrometry data timing sequence or between the ion mobility spectrum data and a peak position.

Next, the parent ions obtained by the secondary separation by the ion mobility spectrometer 104 are passed into the mass spectrometer 105. The mass spectrometer 105 can dissociate the parent ions, perform mass spectrometry analysis on the dissociated daughter ions, and obtain multiple mass spectra to form a mass spectrometry data set by using a data acquisition method of data independent acquisition.

In the analysis process of the mass spectrometry data set, the mass spectrometry data set can be deconvoluted according to the chromatographic data of the chromatographic instrument 100 and the ion mobility spectrum data of ion mobility spectrometer 104. Since the daughter ions from the same parent ion have the same retention time and ion mobility, and have similar or the same peak shapes, chromatographic data and ion mobility spectrum data can effectively assist a clustering task of daughter ions for placing daughter ions from the same parent ion into one category.

Specifically, in the present embodiment, the chromatographic instrument 100, the ion mobility spectrometer 104, and the mass spectrometer 105 are provided sequentially along a transmission flow path of samples or sample ions, the chromatographic instrument 100 is provided upstream of the transmission flow path of samples or sample ions, the mass spectrometer 105 is provided downstream of the transmission flow path of samples or sample ions, and the ion mobility spectrometer 104 is provided between the chromatographic instrument 100 and the mass spectrometer 105.

An ionization device 102 is provided between the chromatographic instrument 100 and the ion mobility spectrometer 104. The effluents (intermediates) that have been performed primary separation by the chromatographic instrument 100 are ionized into ion beams that are transmitted by an ion optical device and sent into the ion mobility spectrometer 104 for secondary separation. The chromatographic instrument 100 and the ion mobility spectrometer 104 have different operating cycles or operating frequencies. The general analysis duration of separation for liquid mixture by the chromatographic instrument 100 is typically several minutes or hours, and the operation duration of a single cycle of the ion mobility spectrometer 104 is in a range of milliseconds to seconds. Therefore, the ion mobility spectrometer 104 can be utilized to increase separation of the second dimension before the ions are sent into the mass spectrometer 105, and perform effective separation on the components that are difficult to be effectively separated by the chromatographic instrument 100 according to the retention time.

It should be noted that the depiction of the positional relationship between the chromatographic instrument 100, the ion mobility spectrometer 104, and the mass spectrometer 105 in FIG. 1 is merely illustrative, and does not strictly limit the positions of the chromatographic instrument 100, the ion mobility spectrometer 104, and the mass spectrometer 105 in mass spectrometry systems. In other embodiments, the chromatographic instrument 100, the ion mobility spectrometer 104, and the mass spectrometer 105 may also be configured in an integrated manner, and the relative positional relationship between each other among the three may also be reversed. For example, although in the present embodiment, the sample ions are separated by the ion mobility spectrometer 104, and then passed into the mass spectrometer 105 for ion mass selection, dissociation, detection, or the like, this position selection or coordination is only illustrative. In some other embodiments, a first mass analyzer 106 of the mass spectrometer 105 may be used first for ion mass selection, and then the ions after mass selection are transported to the ion mobility spectrometer 104 at a lower level.

In the present embodiment, an ordinary liquid chromatographic instrument is selected as the first separation device by way of example for introduction. In other embodiments, the first separation device can also be a high performance liquid chromatographic instrument, an ultrahigh performance liquid chromatographic instrument or a gas chromatographic instrument. The liquid chromatographic instrument can be based on size exclusion chromatography, ion exchange chromatography or pH gradient chromatography. In addition, the first separation device may further include a capillary electrophoresis separation device; a capillary electrophoresis chromatographic separation device; a hard ceramic-based multilayer microfluidic separation device; a gel permeation chromatographic separation device; or a supercritical fluid chromatographic separation device, etc.

Ionization Device

The intermediates obtained through chromatographic separation are passed into the ionization device 102 for ionization, and the ionization device 102 includes an ion source selected from the group consisting of: (i) electrospray ionization ("ESI") ion source; (ii) atmospheric pressure photoionization ("APPI") ion source; (iii) atmospheric pressure chemical ionization ("APCI") ion source; (iv) matrix assisted laser desorption ionization ("MALDI") ion source; (v) laser desorption ionization ("LDI") ion source; (vi) atmospheric pressure ionization ("API") ion source; (vii) desorption ionization on silicon ("DIOS") ion source; (viii) electron impact ("EI") ion source; (ix) chemical ionization ("CI") ion source; (x) field ionization ("FI") ion source; (xi) field desorption ("FD") ion source; (xii) inductively coupled plasma ("ICP") ion source; (xiii) fast atom bombardment ("FAB") ion source; (xiv) liquid secondary ion mass spectrometry ("LSIMS") ion source; (xv) desorption electrospray ionization ("DESI") ion source; (xvi) Nickel-63 radioactive ion source; (xvii) atmospheric matrix-assisted laser desorption ionization ion source; (xviii) thermospray ion source; (xix) atmospheric sampling glow discharge ionization ("ASGDI") ion source; (xx) glow discharge ("GD") ion source; (xxi) impactor ion source; (xxii) direct analysis in real time ("DART") ion source; (xxiii) laser spray ionization ("LSI") ion source; (xxiv) sonic-spray ionization ("SSI") ion source; (xxv) matrix-assisted inlet ionization ("MAII") ion source; (xxvi) solvent assisted inlet ionization ("SAII") ion source; (xxvii) Penning ionization ion source; (xxviii) laser ablation electrospray ionization ("LAESI") ion source; and (xxix) He plasma (HePl) ion source. More preferably, a desorption electrospray ionization ("DESI") ion source, a matrix-assisted laser desorption ionization ("MALDI") ion source, a direct analysis in real time ("DART") ion source, and a laser ablation electrospray ionization ("LAESI") ion source, or the like, under chamber pressure or a real-time ion source are used.

It should be noted that, although in the present embodiment, the ionization device 102 is configured between the first separation device (chromatographic instrument 100) and the second separation device (ion mobility spectrometer 104) before the mass spectrometer 105, arrangement positions and manners are merely illustrative. In other embodiments, the relative positions of the ionization device 102 and the first separation device and the second separation device can also be adjusted according to actual needs, e.g., when the separation of the first separation device needs to be performed for the ion sample, the ionization device 102 can also be configured before the first separation device.

Ion Mobility Spectrum

The ion mobility spectrometer 104 can use a drift tube ion mobility spectrometry (DTIMS), a field asymmetric waveform ion mobility spectrometry (FAIMS, also known as differential mobility spectrometry, DMS), a travelling-wave ion mobility spectrometry (TW-IMS), an aspiration ion mobility spectrometry (AIMS), a tandem-trapped ion mobility spectrometry (TIMS), a U-shape ion mobility analyzer (UMA, e.g., using a device structure provided in CN109003876A) or any other ion mobility spectrometers in suitable forms.

In some embodiments, the ion mobility spectrometer 104 includes an ion introduction device for introducing the intermediates into a post-stage device, or temporarily storing the received intermediates and simultaneously releasing the intermediates to the post-stage device; and an ion mobility separation device provided downstream of the ion introduction device for receiving the intermediates and separating the intermediates during the moving process according to differences in ion mobility.

Mass Spectrometry

The mass spectrometer 105 in the present embodiment may be any mass spectrometer 105 capable of providing accurate mass measurements for daughter ion peaks and performing data independent acquisition.

In the present embodiment, the mass spectrometer 105 connected in series with the ion mobility spectrometer 104 operating in an ion mobility filter mode includes a quadrupole mass analyzer, a collision cell, and a time-of-flight mass analyzer that are connected sequentially in series. The quadrupole mass analyzer is provided at a preceding stage of the collision cell as the first mass analyzer 106 of the mass spectrometer 105; the collision cell is provided between the quadrupole mass analyzer and the time-of-flight mass analyzer, and serves as a dissociation unit 108 to dissociate the passing ions; and the time-of-flight mass analyzer is provided at a post stage of the collision cell as the second mass analyzer 110 of the mass spectrometer. The first mass analyzer 106 and the second mass analyzer 110 together form a detection unit in the present embodiment.

In some embodiments, the functions of the collision cell and the second mass analyzer 110 may also be integrated in the same mass analyzer, such as an ion trap mass analyzer. The ion trap mass analyzer can integrate various functions such as transmission, mass selection, dissociation of ions, and the like, and utilizes a simple device structure to dissociate ions with a specific mass-to-charge ratio or in a mass-to-charge ratio range from received or stored ions, so that the ions can be performed multiple tandem analyses in a time dimension to provide more detail information for structural analysis of compounds. For example, in some embodiments, a structure in which the quadrupole and the ion trap mass analyzer are connected in series may also be used to perform tandem analysis.

Collision Cell

In the mass spectrometer 105 provided in this embodiment, in order to achieve data independent acquisition, a collision cell that can change dissociation energy is used to control the extent to which ions passing through the collision cell are dissociated. Specifically, with low dissociation energy, the ions passing through the collision cell are not dissociated or dissociated at a low degree, so that spectrum information of the parent ions can be collected at the post stage of the collision cell; when the collision cell is running with high dissociation energy, the ions passing through the collision cell can be dissociated at a higher degree, so that spectrum information of the daughter ions can be collected at the post stage of the collision cell by adjusting the dissociation energy. The collision cell is set to periodically switch between high-low dissociation energy, and can obtain the spectrum information of the parent ions and the daughter ions respectively at different time intervals within a cycle as a basis for a classification task between the parent ions and the daughter ions.

The dissociation unit 108 may be selected from the group consisting of: (i) collision-induced dissociation ("CID") fragmentation device; (ii) surface-induced dissociation ("SID") fragmentation device; (iii) electron transfer dissociation ("ETD") fragmentation device; (iv) electron capture dissociation ("ECD") fragmentation device; (v) electron collision or impact dissociation fragmentation device; (vi) photo-induced dissociation ("PID") fragmentation device; (vii) laser-induced dissociation fragmentation device; (viii) infrared radiation induced dissociation device; (ix) ultraviolet radiation induced dissociation device; (x) nozzle-skimmer interface fragmentation device; (xi) in-source fragmentation device; (xii) in-source collision induced dissociation fragmentation device; (xiii) thermal or temperature source fragmentation device; (xiv) electric field induced fragmentation device; (xv) magnetic field induced fragmentation device; (xvi) enzymatic digestion or enzymatic degradation fragmentation device; (xvii) ion-ion reaction fragmentation device; (xviii) ion-molecule reaction fragmentation device; (xix) ion-atom reaction fragmentation device; (xx) ion-metastable ion reaction fragmentation device; (xxi) ion-metastable molecular reaction fragmentation device; (xxii) ion-metastable atom reaction fragmentation device; (xxiii) ion-ion reaction device used for reacting ions to form adducts or product ions; (xxiv) ion-molecular reaction device used for reacting ions to form adducts or product ions; (xxv) ion-atom reaction device used for reacting ions to form adducts or product ions; (xxvi) ion-metastable ion reaction device used for reacting ions to form adducts or product ions; (xxvii) ion-metastable molecular reaction device used for reacting ions to form adducts or product ions; (xxviii) ion-metastable atom reaction device used for reacting ions to form adducts or product ions; and (xxix) electron ionization dissociation ("EID") fragmentation device.

In a low dissociation mode, a voltage applied to the collision cell is reduced to adjust the dissociation energy into a relatively low value. In some embodiments, the magnitude of the voltage applied to the collision cell is selected from the group consisting of: $\leq 5V$; $\leq 4.5V$; $\leq 4V$; $\leq 3.5V$; $\leq 3V$; $\leq 2.5V$; $\leq 2V$; $\leq 1.5V$; $\leq 1V$; $\leq 0.5V$; or basically equal to 0V.

In a high dissociation mode, the voltage applied to the collision cell is increased to adjust the dissociation energy into a relatively high value. In some embodiments, the magnitude of the voltage applied to the collision cell is selected from the group consisting of: $\leq 10V$; $\leq 15V$; $\leq 20V$; $\leq 30V$; $\leq 40V$; $\leq 50V$; $\leq 100V$; $\leq 50V$; $\leq 200V$.

Quadrupole Mass Analyzer

As the first mass analyzer 106 of the mass spectrometer, the quadrupole mass analyzer is used to select ions with a suitable mass-to-charge ratio value or in a mass-to-charge ratio range to enter the collision cell for dissociation.

In the present embodiment, when it is required to obtain a mass spectrum with low dissociation energy, such as a parent-ion spectrum, the collision cell can be set to work under a low dissociation energy state, and simultaneously a quadrupole mass analyzer is used for scanning within a full mass-to-charge ratio range or leading all the ions to pass into the second mass analyzer that selects ions based on a mass-to-charge ratio, thereby obtaining the mass spectrum of the parent ions. When it is required to obtain a mass spectrum with high dissociation energy, such as a daughter-ion spectrum, the collision cell can be set to work under a high dissociation energy state, and scan the full mass-to-charge ratio range of ions to obtain multiple daughter-ion mass spectra in a manner of stepwise selecting multiple mass-to-charge ratio windows. In the present embodiment, one parent-ion spectrum and multiple daughter-ion spectra can be acquired in each operating cycle of the mass spectrometer. In other embodiments, the number of spectra collected in each operating cycle can also be flexibly selected according to actual needs, and is not limited to the above manners. The parent-ion spectrum and the daughter-ion spectrum are combined to form a mass spectrometry data set for processing by the processor 112.

It should be noted that although both the parent-ion spectrum and the daughter-ion spectrum are collected in the present embodiment, in some embodiments, it is also possible to only collect the daughter-ion spectrum. In the subsequent data analysis process, clustering is performed for the mass spectrometry data set, and the daughter ions having the same or similar characteristics are clustered and determined to come from the same parent ion, while the category identification for the parent ions as well as the corresponding establishment between the parent ions and the daughter ions can be selectively implemented in the data analysis process.

Since in the data independent acquisition method, each mass-to-charge ratio window contains a plurality of parent ion peaks in most cases, and if the parent ion peaks can be clearly paired with the daughter ion peaks in the daughter-ion spectrum, mass spectrometry data containing dissociation information corresponding to the analyte can be analyzed and obtained. Then, searching and comparison is performed from the existing mass spectrometry database to identify the chemical formula, relative molecular mass, conformation, configuration and other information of the analyte.

In the present embodiment, the quadrupole mass analyzer can adjust the mass-to-charge ratio in a stepwise manner. Specifically, it is possible to sequentially select different mass-to-charge ratio windows from a plurality of mass-to-charge ratio windows formed by division in the full mass-to-charge ratio range until the full mass-to-charge ratio range is covered. The order of selecting the mass-to-charge ratio windows can be from large to small or from small to large.

For analysis tasks that mainly take small mass ions as analytes, such as metabolomics analysis, the full mass-to-charge ratio range usually corresponds to the range of mass-to-charge ratio between about 100 to 600; for analysis tasks that mainly take polypeptides as analytes, such as proteomics analysis, the full mass-to-charge ratio range usually corresponds to the range of mass-to-charge ratio between about 400 to 1400.

Mass-to-Charge Ratio Window

The selected or separated ions have mass-to-charge ratio values distributed in a specified range that is exactly the corresponding mass-to-charge ratio window. In some embodiments, each mass-to-charge ratio window may include 5 consecutive mass-to-charge ratio numbers, that is, the maximum and minimum values within the range differ by 5 mass-to-charge ratio numbers, in other words, a mass-to-charge ratio window of "+/−2.5 Dalton". The widths of the plurality of mass-to-charge ratio windows are variable or consistent within the full mass-to-charge ratio range. The plurality of mass-to-charge ratio windows may overlap partially or not overlap at all.

In the present embodiment, the ion release of the ion mobility spectrometer is synchronized with the mass analysis of the mass spectrometer. Specifically, the synchronization mode in the present embodiment is that when the ion mobility spectrometer completes ion release within a certain ion mobility or ion-gas collision cross-sectional area, the mass analyzer synchronously completes scanning within one or more mass-to-charge ratio ranges, such as parent-ion scanning within the full mass-to-charge ratio range, and daughter-ion scanning for a plurality of mass-to-charge ratio windows within the full mass-to-charge ratio range.

Time-of-Flight Mass Analyzer

The time-of-flight mass analyzer, as the second mass analyzer 110 of the mass spectrometer in the present embodiment, is mainly used for analysis of parent/daughter ions. The accelerated ions are separated in the time-of-flight mass analyzer according to dimension of mass-to-charge ratios, and reach a detector that records mass spectra of the ions. An ion mass spectrum recorded in the low dissociation mode is used as a low dissociation spectrum, for example, as a parent-ion spectrum; an ion mass spectrum recorded in the high dissociation mode is used as a high dissociation spectrum, for example, as a daughter-ion spectrum.

In some embodiments of the present invention, the first mass analyzer 106, the second mass analyzer 110 may be selected from the group consisting of: (i) quadrupole mass analyzer; (ii) 2D or linear quadrupole mass analyzer; (iii) Paul or 3D quadrupole mass analyzer; (iv) Penning trap mass analyzer; (v) ion trap mass analyzer; (vi) magnetic sector mass analyzer; (vii) ion cyclotron resonance (ICR) mass analyzer; (viii) Fourier-transform ion cyclotron resonance (FTICR) mass analyzer; (ix) electrostatic mass analyzer arranged to generate an electrostatic field having a quadro-logarithmic potential distribution; (x) Fourier-transform electrostatic mass analyzer; (xi) Fourier transform mass analyzer; (xii) time-of-flight mass analyzer; (xiii) orthogonal acceleration time-of-flight mass analyzer; and (xiv) linear acceleration time-of-flight mass analyzer.

In the present embodiment, the first mass analyzer 106 is a quadrupole mass analyzer, and in other embodiments of the present invention, the first mass analyzer 106 is preferably configured as a time-of-flight mass analyzer, a magnetic mass analyzer, or other suitable types of mass analyzers, as long as the first mass analyzer can continuously select ions of different mass-to-charge ratio windows to pass through so as to complete scanning of the selected mass-to-charge ratio range or the full mass-to-charge ratio range.

In the present embodiment, the second mass analyzer 110 is a time-of-flight mass analyzer, and in other embodiments, the form of the second mass analyzer 110 is not limited thereto, e.g., it may also be preferable to adopt a quadrupole mass analyzer, a magnetic mass analyzer, a Fourier transform mass analyzer or any other suitable types of mass analyzers.

In some embodiments, at least part of the first mass analyzer 106, the dissociation unit 108, and the second mass analyzer 110 may also be integrated in the same ion trap mass analyzer, for example, the same ion trap mass analyzer is used to achieve dissociation and analysis of ions to reduce size of device and provide more detail information of the compounds.

Control Flow

A mass spectrometry system 1 provided by the present embodiment can be applied to qualitative or quantitative analysis of metabonomics, proteomics and the like. Specifically, when analyzing an analyte in the form of a mixture, the mixed analyte can be provided with three separations in orthogonal dimensions, including separation of chromatography in the retention time dimension, separation of the ion mobility spectrum in the ion mobility dimension, and separation of mass spectrometry in the mass-to-charge ratio dimension, so that mathematical deconvolution can be performed to correspond the parent ions with the daughter ions and identify type and amount of each component in the mixed analyte by using characteristics that the parent ions and the daughter ions of the same analyte have the same elution peak shape, retention time, or ion mobility on the chromatogram and the ion mobility spectrum.

Figure 3:
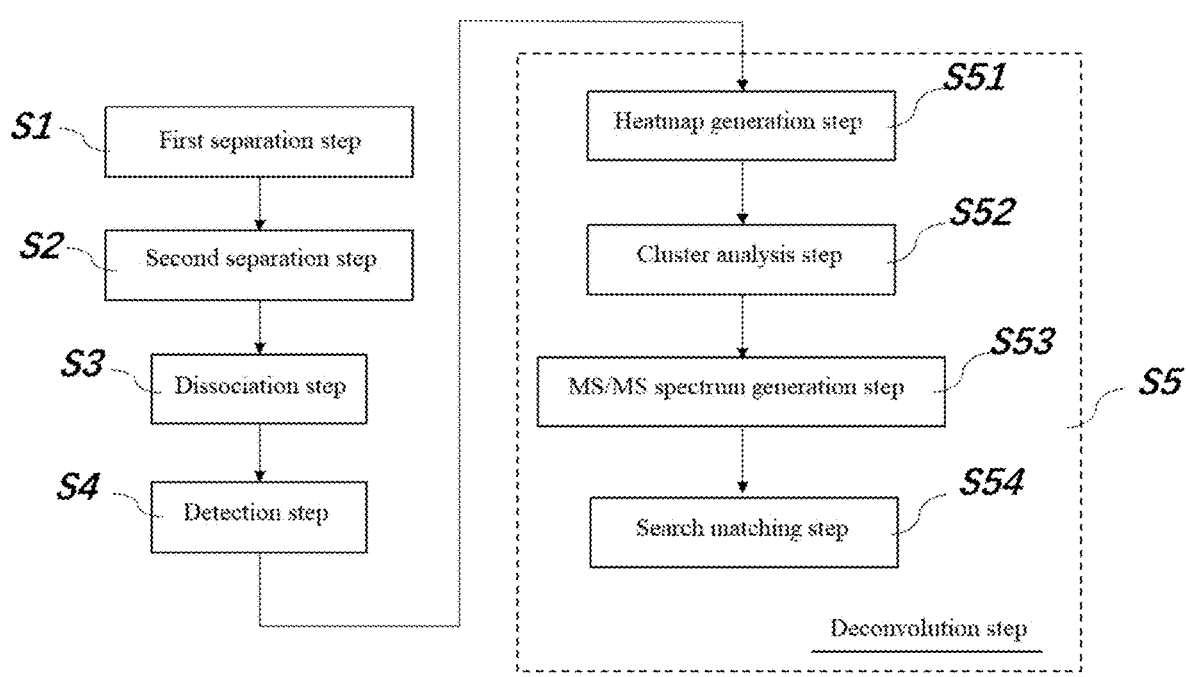
FIG. 3 is a flow chart of a mass spectrometry analysis method of the embodiment in FIG. 1.

For the control between different modules, the mass spectrometry analysis method as shown in FIG. 3 is adopted. Specifically, the mass spectrometry analysis method provided in the present embodiment includes the following steps.

S1, a first separation step, in which a sample is separated to obtain multiple groups of intermediates based on differences of the first physicochemical property, In the present embodiment, the sample is separated based on the difference in the retention time for each component in the sample when passing through the chromatographic column to obtain multiple groups of intermediates as effluents of the chromatogram.

S2, a second separation step, in which intermediates or ionized intermediates are separated to obtain multiple groups of parent ions based on differences of a second physicochemical property.

In the present embodiment, the sample is separated by the chromatographic instrument 100 and then introduced into the ion mobility spectrometer 104 for secondary separation. The ion mobility spectrometer 104 performs separation based on differences in ion mobility (or related physicochemical properties such as ion-gas collision cross-sectional area) to obtain characteristic data associated with the ion mobility, such as spectrum data of the ion mobility spectrum.

It should be noted that the process of ionizing the sample is not limited to occur after the first separation step S1, but can also occur before the first separation step S1, in other words, the technical solution of ionization before the first separation step S1 should also be included within the scope of the present invention if not departing from the spirit of the present invention.

In this embodiment, in the second separation step S2, the second separation unit operates in a filter mode and screens out ions having ion mobility within the specified range from received second isolates for release.

S3, a dissociation step, in which at least parts of the parent ions are dissociated, and the dissociated parent ions correspondingly generate a plurality of daughter ions.

S4, a detection step, in which at least an intensity of a daughter ion, generated in the dissociation step, is detected.

Dissociation is performed on the sample ions that elute after processing in step S2, and mass spectrometry detection of the daughter ions obtained after the dissociation is performed. It should be noted that in the S4 step, the mass spectrometer 105 implements mass spectrometry detection for the dissociated daughter ions, but does not limited to mass spectrometry detection only for the daughter ions. In some embodiments, mass spectrometry analysis for undissociated parent ions or parent ions with a low dissociation degree may also be performed as desired.

In the present embodiment, in the mass spectrometry analysis step, the analysis of the parent ion is performed by the cooperation between the first mass analyzer 106 and the second mass analyzer 110 that are provided in the mass spectrometer 105, and the dissociation unit 108 is provided between the first mass analyzer 106 and the second mass analyzer 110, in which the first mass analyzer 106 is used to select ions in a full mass-to-charge ratio range or a partial mass-to-charge ratio range to pass into the dissociation unit 108, and the second mass analyzer 110 acquires mass spectrometry data of the daughter ions generated by the dissociation unit 108.

In other embodiments of the present invention, the ion trap mass analyzer can also be used to collect parent-ion mass spectrometry data and daughter-ion mass spectrometry data obtained by tandem mass spectrometry analysis, in which the tandem mass spectrometry analysis is repeated multiple times continuously.

According to a sample transport path, the S1, S2, and S3 steps are performed on samples mixed with multiple components, thereby completing the separation and data recording processes of the sample synchronously during the analysis. In some embodiments, another separation step can be performed multiple times during an execution cycle of one type of separation step due to the fact that execution frequencies of the periodically repeated S1, S2, and S3 steps are not the same. For example, in the execution cycle of the S1 step, the S2 step can be performed multiple times, in other words, ion mobility spectrum separation can be performed several times and multiple ion mobility spectra are recorded in the process of performing chromatographic separation and recording a chromatogram, and mass spectrometric separation can be performed several times and multiple mass spectra can be recorded in the process of performing ion mobility spectrum separation and recording an ion mobility spectrum. Of course, the above description is merely exemplary, and is not intended to strictly limit cycle time relationships among separation methods.

In some embodiments, before the S3 dissociation step, the mass spectrometry analysis method may further include: a charge state determination step that determines the charge state of the parent ion according to the relationship between the mass-to-charge ratio of the parent ion and the ion mobility; and a parent-ion screening step that selects the parent ions with a specified charge state for passing through and dissociation according to the charge state determined in the charge state determination step. The selection method can be a functional relationship established based on the first parameter, the second parameter and/or a mass-to-charge ratio parameter. Through the above method, the parent ions of target type can be further screened out, and dissociation and mass spectrometry analysis of the parent ions can be performed more targetedly, thereby improving the qualitative and quantitative performance of mass spectrometry analysis.

S5, deconvolution step, in which the spectrogram data set is deconvoluted to categorize the daughter ions from the same parent ion according to the two-dimensional features including the first parameter and the second parameter.

In the present embodiment, the S5 deconvolution step specifically includes the following steps.

S51, heatmap generation step, in which a coordinate system is established with the first parameter and the second parameter to generate multiple heatmaps based on the spectrum data set, and each heatmap is associated with intensity distribution of daughter ions of one type of mass-to-charge ratio or within a mass-to-charge ratio range.

In the S51 heatmap generation step, the collected mass spectrometry data of the daughter ions of one type of mass-to-charge ratio or within a mass-to-charge ratio range are aggregated in a heatmap established with ion mobility M and retention time RT as the coordinate system. In the present embodiment, the size of the mass-to-charge ratio range includes three mass-to-charge ratio numbers. Therefore, each heatmap will integrate the daughter-ion mass spectrometry data within a range of three mass-to-charge ratio numbers.

Refer to FIG. 3, since the daughter ions from the same parent ion should have basically the same retention time and ion mobility, these daughter ions with the same or similar retention time and ion mobility will be adjacent to each other on the heatmap, and form a "characteristic spot" occupying a certain retention time range and a certain ion mobility range after integration. Color gradation of the "characteristic spot" represents ion intensity of corresponding mass-to-charge ratios or ion intensity integral within a corresponding mass-to-charge ratio range of corresponding positions in the retention time and ion mobility coordinate system.

In addition, in the S51 heatmap generation step, ions within a certain mass-to-charge ratio range can be selected and combined to generate a heat map correspondingly. The size of the mass-to-charge ratio range can be preset or user defined.

In the present embodiment, the process of daughter ion classification relies on a feature matching (e.g., pattern recognition) process for "characteristic spot". Specifically, in order to place daughter ions from the same parent ion into one category, the following step is executed:

S52, cluster analysis step, in which features that occupy the same first parameter range and the same second parameter range and match each other in different heatmaps are clustered according to a cluster model.

Although the daughter ions from the same parent ion are dissociated to different degrees, the timing sequence should correspond to the parent ion with the same retention time and ion mobility, and the chromatographic peak shape and ion mobility spectrum peak shape corresponding to these daughter ions should be similar, in other words, the three-dimensional shape of the "characteristic spot" obtained by combining the chromatographic peak shape and the ion mobility spectrum peak shape (peak shape by combining three dimensions of ion mobility-retention time-intensity) should also be similar. In the present embodiment, the cluster analysis performed by using the similarity of the three-dimensional shape of the "characteristic spot" can effectively improve clustering accuracy, and can be adapted to a current relatively mature feature matching technology and has a broad prospect for popularization and application.

It should be noted that in the S52 cluster analysis step, the conditions set for the same parameter range and the matching of the "characteristic spot" are basically the same and basically matching in clustering conditions. In other words, a certain amount of error can be set to be allowed for the determination of matching, for example, the similarity is higher than a threshold value.

In some embodiments of the present invention, the clustering algorithm can be further performed based on the following steps:

S521, performing information region division on a two-dimensional plane formed by the first physical property (e.g., retention time) and the second physical property (e.g., ion mobility), and picking information region blocks needed by the subsequent steps;

S522, characterizing data in the picked connected region blocks, and constructing characteristic parameters of bearing region block information;

S523, performing boundary feature division according to the obtained characteristic parameters sets; and S524, placing the characteristic parameter sets in the same partition unit into the same category of relationship between parent ions and daughter ions.

S53, MS/MS spectrum generation step, in which an MS/MS spectrum of clustered daughter ions is generated based on a mass-to-charge ratio or a mass-to-charge ratio range corresponding to the heatmap where clustered "characteristic spot" is located, for example, the MS/MS spectrum can be constructed according to the clustering situation of the region block information in the S521 step.

Figure 4:
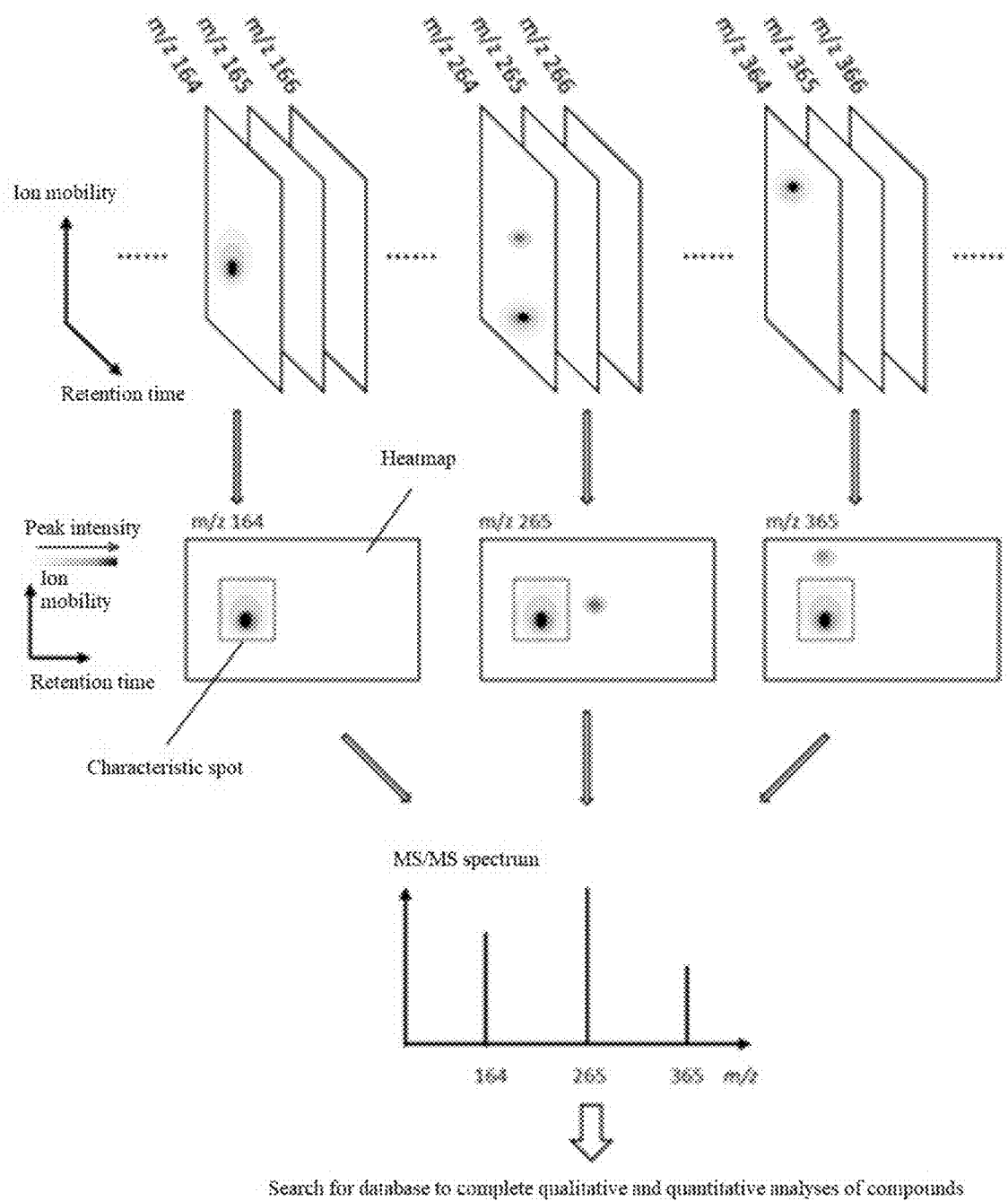
FIG. 4 is a data analysis flow of a deconvolution process in the mass spectrometry analysis method of the embodiment in FIG. 1.

Specifically, if it is found in a search process for different heatmaps that the same or basically the same "characteristic spots" appear in similar positions in some heatmaps, for example, in FIG. 4, the "characteristic spots" appear at m/z 164-166, m/z 264-266, and m/z 364-366, then the daughter ions corresponding to these "characteristic spots" can be determined as the daughter ions from the same parent ion. Meanwhile, the repeated appearance of "characteristic spots" at m/z 164-166, m/z 264-266, and m/z 364-366 in the heatmaps indicates that the parent ion can dissociate the daughter ions generated within the range of m/z 164-166, m/z 264-266 and m/z 364-366.

In order to further identify the type of the parent ion, one way is to compare the mass spectrum generated by the dissociation of the parent ion with the mass spectrometry data stored in an existing database to distinguish the type of the parent ion.

The comparison of the mass spectrometry data needs to rely on the matching of peak positions and peak intensity data, in which the preliminary distinguish method of the peak position has been introduced above, and will not be repeated herein (if a specific mass-to-charge ratio is required to clarified, it is possible to further find that the "characteristic spot" comes from daughter ions of which type of mass-to-charge ratio).

In the mass spectrum, peak intensity of daughter ions of each type of mass-to-charge ratio in the embodiment can be solved for the "characteristic spots" in the heatmap by using "the volume under the surface" method. That is, intensity data of the daughter ions in the characteristic spot are integrated to obtain the peak intensity data corresponding to the "characteristic spot", and the peak intensity data can serve as the peak intensity data corresponding to the daughter ions in the mass spectrum after homogenization processing.

In the above manner, both the peak positions and the peak intensity data can be obtained through analysis, and a mass spectrum corresponding to the "characteristic spot" can be generated according to the peak positions and the corresponding peak intensity data.

After completing the generation of mass spectrum of each "characteristic spot", the following step is performed:

S54, search matching step, in which a pre-established database is searched for substance identification of the parent ion according to an MS/MS spectrum generated in the S53 MS/MS spectrum generation step and the corresponding relationship between parent ions and daughter ions.

By searching the pre-established database, the type of parent ion can be determined to meet qualitative requirements. In addition, since the peak intensity data of each group of daughter ions can be solved by integration, concentration proportions between parent ions determined by searching can also be determined by calculating the proportions of peak intensity data, which can also meet the quantitative requirements of omics analysis.

In some embodiments, the cluster model can also be trained according to scores of clustering results. Specifically, the mass spectrometry analysis method further includes: a cluster model training step, in which the cluster analysis model is trained according to scores of clustering results in the S52 cluster analysis step. The cluster model is continuously optimized through a machine learning algorithm, so that ion identification capability can be more effectively improved.

Figure 5:
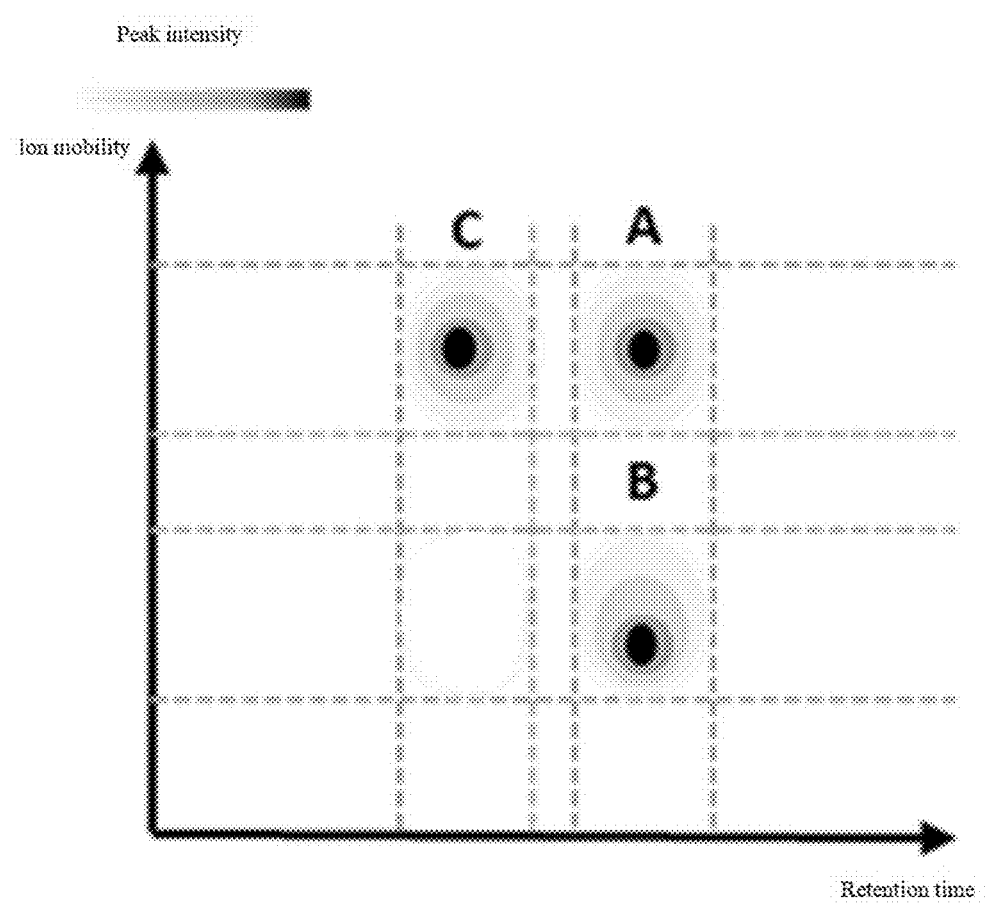
FIG. 5 is a schematic diagram of a two-dimensional heatmap obtained by analyzing IonA, IonB, and IonC by the mass spectrometry analysis method of the embodiment in FIG. 1.

Through the above method, as to IonA, IonB and IonC described in the background art, the three different ions will show a distribution state on the heatmap in FIG. 5. When deconvoluting the three characteristic spots, since the three characteristic spots occupy different ranges on the two-dimensional heatmap, the daughter ions are classified according to the characteristic spots, which can clearly distinguish IonA from IonB and IonC, and different corresponding parent ions are found from the database, thereby improving the qualitative and quantitative ability of data analysis.

The above are only preferred embodiments of the present invention and are not intended to limit the present invention. Any modification, equivalent substitution, improvement or the like within the spirit and principle of the invention should be included in the scope of the present invention.

What is claimed is:

1. A mass spectrometry analysis method, comprising the steps of:
    a first separation step, separating a sample to obtain multiple groups of intermediates based on differences of a first physicochemical property;
    a second separation step, separating the intermediates or ionized intermediates to obtain multiple groups of parent ions based on differences of a second physicochemical property;
    a dissociation step, dissociating at least a part of the parent ions, and dissociated parent ions correspondingly generate a plurality of daughter ions;
    a detection step, at least detecting intensities of the daughter ions generated in the dissociation step;
    wherein during implementation of the mass spectrometry analysis method, intensity data of the daughter ions, a first parameter of the daughter ions associated with the first physicochemical property, and a second parameter of the daughter ions associated with the second physicochemical property are all recorded to form a spectrogram data set,
    the mass spectrometry analysis method further comprising:
    a deconvolution step, deconvoluting the spectrogram data set to categorize the daughter ions from the same parent ion according to two-dimensional features including the first parameter and the second parameter.

2. The mass spectrometry analysis method according to claim 1, wherein intensities of the multiple groups of parent ions are also detected in the detection step.

3. The mass spectrometry analysis method according to claim 2, wherein the detection step includes stopping or reducing dissociation energy applied to the parent ions so as to detect intensities of multiple groups of the parent ions.

4. The mass spectrometry analysis method according to claim 1, wherein the deconvolution step includes
    a heatmap generation step, in which a coordinate system is established with the first parameter and the second parameter to generate multiple heatmaps based on the spectrogram data set, and each heatmap is associated with daughter ions of one type of mass-to-charge ratio or within a mass-to-charge ratio range; and
    a cluster analysis step, in which three-dimensional features that occupy the same first parameter range and the same second parameter range and match each other in different heatmaps are clustered according to a cluster analysis model.

5. The mass spectrometry analysis method according to claim 4, further comprising:
    a cluster model training step, wherein the cluster analysis model is trained according to scores of clustering results in the cluster analysis step.

6. The mass spectrometry analysis method according to claim 4, further comprising:
    an MS/MS spectrum generation step, wherein an MS/MS spectrum of clustered daughter ions is generated based on a mass-to-charge ratio or a mass-to-charge ratio range corresponding to the heatmap where clustered feature distribution is located; and
    a search matching step, wherein a pre-established database is searched for substance identification of the parent ion according to an MS/MS spectrum generated in the MS/MS spectrum generation step and a corresponding relationship between parent ions and daughter ions.

7. The mass spectrometry analysis method according to claim 6, wherein in the MS/MS spectrum generation step, integral is performed with respect to intensity data of the daughter ions that are clustered in the heatmap so as to determine the intensities of the daughter ions corresponding to the mass-to-charge ratio or the mass-to-charge ratio range in the MS/MS spectrum.

8. The mass spectrometry analysis method according to claim 1, wherein the intensity data of the daughter ions are acquired using a data independent acquisition method.

9. A mass spectrometry system, comprising:
a first separation unit used for separating a sample to obtain multiple groups of intermediates based on differences of a first physicochemical property;
a second separation unit used for separating the intermediates or ionized intermediates to obtain multiple groups of parent ions based on differences of a second physicochemical property;
a dissociation unit used for dissociating at least a part of the parent ions, wherein dissociated parent ions correspondingly generate a plurality of daughter ions;
a detection unit at least used for detecting intensities of the daughter ions generated in the dissociation unit,
wherein the mass spectrometry system can record intensity data of the daughter ions, first parameters of the daughter ions associated with the first physicochemical property, and second parameters of the daughter ions associated with the second physicochemical property, so as to form a spectrogram data set,
the mass spectrometry system further comprising:
a processor used for deconvoluting the spectrogram data set according to two-dimensional features including the first parameters and the second parameters, so as to categorize the daughter ions from the same parent ion.

10. The mass spectrometry system according to claim 9, wherein the first separation unit is a chromatographic instrument and the second separation unit is an ion mobility spectrometer.

11. The mass spectrometry system according to claim 10, wherein the ion mobility spectrometer is one or a combination among a drift tube ion mobility spectrometer, a field asymmetric waveform ion mobility spectrometer, a traveling wave ion mobility spectrometer, an aspiration ion mobility spectrometer, a tandem-trapped ion mobility spectrometer, and a U-shape ion mobility spectrometer.

12. The mass spectrometry system according to claim 10, wherein the ion mobility spectrometer includes:
an ion introduction device used for introducing the intermediates into a post-stage device, or temporarily storing the received intermediates while releasing the intermediates to the post-stage device at the same time; and
an ion mobility separation device that is provided downstream of the ion introduction device to receive the intermediates and separate the intermediates during a moving process according to differences in ion mobility.

13. The mass spectrometry system according to claim 9, wherein the dissociation unit is a collision chamber, a photodissociation chamber, or an electron capture dissociation chamber.

14. The mass spectrometry system according to claim 9, wherein the dissociation unit and the detection unit are integrated into the same ion trap mass analyzer.

15. The mass spectrometry system according to claim 9, wherein the detection unit includes a first mass analyzer and a second mass analyzer, the first mass analyzer is a quadrupole mass analyzer, an ion trap mass analyzer, or a time-of-flight mass analyzer, and the second mass analyzer is a quadrupole mass analyzer, a time-of-flight mass analyzer or a Fourier transform mass analyzer.

\* \* \* \* \*